Figure 4:
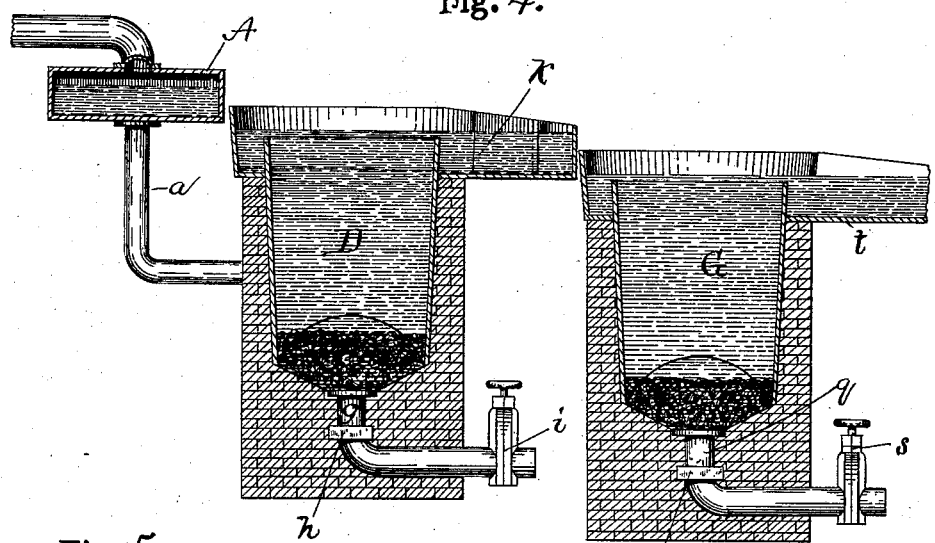

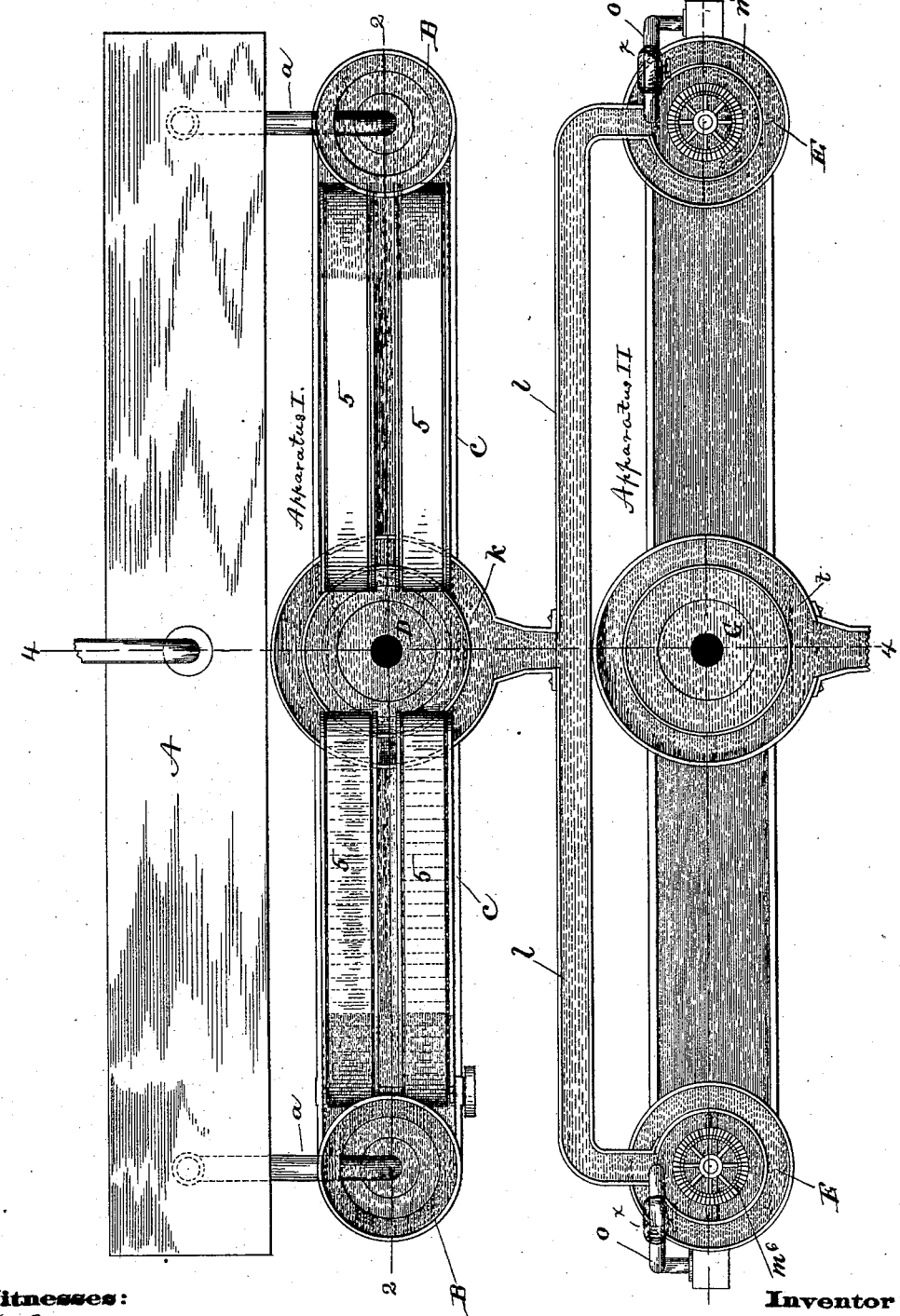

(No Model.) 3 Sheets—Sheet 2.
C. LORTZING.
APPARATUS FOR TREATING SEWAGE.
No. 389,479. Patented Sept. 11, 1888.
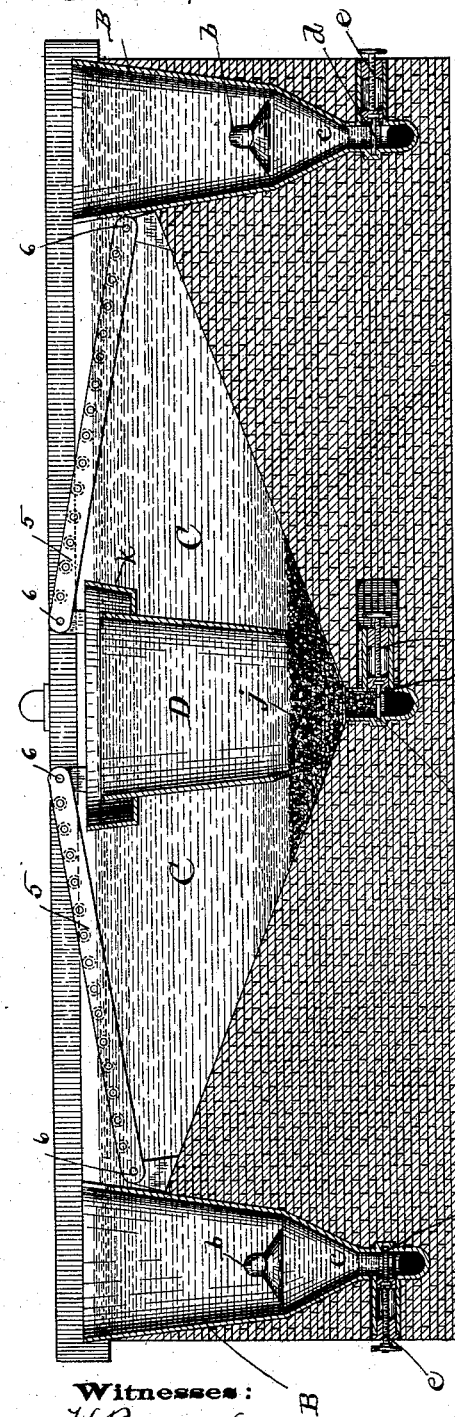
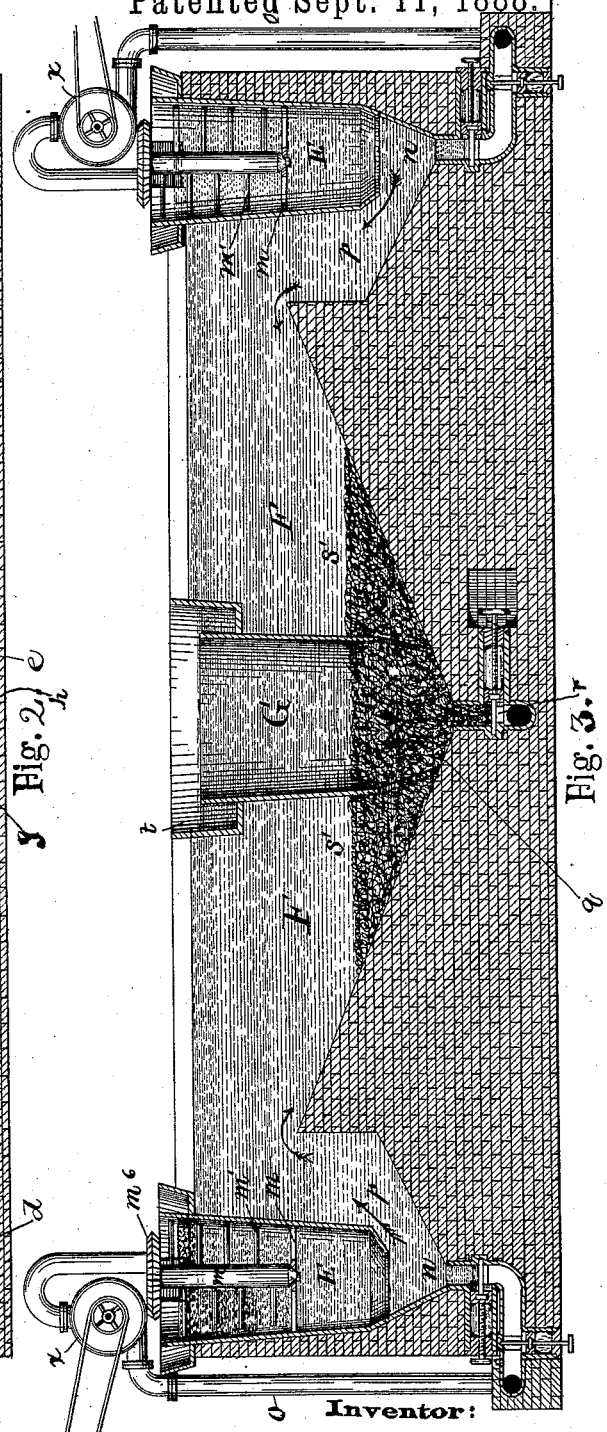
Witnesses:
H. Brown.
W. Ramsay.
Inventor:
Carl Lortzing.
by Might, Brown & Crossley,
attys.

(No Model.)  3 Sheets—Sheet 3.

C. LORTZING.
APPARATUS FOR TREATING SEWAGE.

No. 389,479.  Patented Sept. 11, 1888.

Witnesses:
H. Brown.
W. Ramsay.

Inventor:
Carl Lortzing.
by Wright, Brown & Crossley
attys

UNITED STATES PATENT OFFICE.

CARL LORTZING, OF BOSTON, MASSACHUSETTS, ASSIGNOR, BY DIRECT AND MESNE ASSIGNMENTS, TO CHARLES A. ROGERS, TRUSTEE, OF SAME PLACE.

APPARATUS FOR TREATING SEWAGE.

SPECIFICATION forming part of Letters Patent No. 389,479, dated September 11, 1888.

Application filed December 21, 1886. Renewed June 21, 1888. Serial No. 277,831. (No model.)

*To all whom it may concern:*

Be it known that I, CARL LORTZING, formerly of Berlin, Germany, now residing at Boston, in the county of Suffolk and State of Massachusetts, have invented certain new and useful Improvements in Apparatus for Treating Water-Carried Sewage, of which the following is a specification.

My invention relates especially to those systems of treating water-carried sewage having as their prime purpose the purification of the sewage for health's sake, and, as a secondary consideration, the utilization of the sewage for the purposes of profit, or in order to minimize the cost of treating it with the main object in view.

It is the object of my invention to provide improved apparatus for treating water-carried sewage, whereby the effluent matter of sewers may undergo uninterrupted and effective defection as fast as it forms and before decomposition sets in and dangerous gases are generated.

It is also the object of my invention to provide an improved apparatus whereby the various products, having different commercial value or adapted to different uses, or being without any worth or importance, may be separated from the mass without interruption of the working of the system.

It is also the object of my invention to provide an improved apparatus whereby the water may be deprived of current qualities beyond what is essential to steadily and quietly move it from place to place, and its quality of pressure so utilized as to effect continual, quick, and thorough precipitation of all organic substances.

It is also the object of my invention to provide an improved means whereby chemicals once employed in the purification of sewage may be reused and ingredients thought heretofore to have no material commercial or other value may be utilized to effect defecation and great economy thus attained.

It is also the object of my invention to effect such a separation and concentration of such products of the treated sewage as are adapted to be employed as fertilizers as will remove prejudice or sentimental objection to their use.

It is also the object of my invention to so improve the means employed in the treatment of sewage as to not only occupy comparatively small space, but be simple in construction, and, considering the work to be bone, cost but little to construct or build.

It is also the object of my invention to effect other improvements in systems for the treatment of water-carried sewage incidental to those hereinbefore mentioned.

Reference is to be had to the accompanying drawings, and to the letters of reference marked thereon, forming a part of this specification, the same letters indicating the same parts in all of the views.

Figure 5:
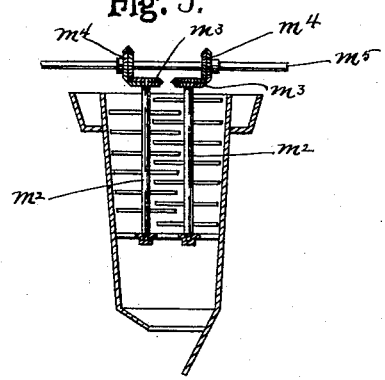

Of the drawings, Figure 1 represents a plan view of the apparatus or instrumentalities embodying my improvements. Fig. 2 represents a vertical section on the line 2 2 of Fig. 1. Fig. 3 represents a vertical section on the line 3 3 of Fig. 1. Fig. 4 represents a transverse ver-vertical section on the line 4 4 of Fig. 1. Fig. 5 represents a modification hereinafter referred to.

In carrying out my improvements two leading or principal operations are pursued: first, preliminary treatment, whereby floating particles—such as fat and fibrine—are separated from the mass, and particles of greatest specific gravity and matter next in order as regards density or greatness of specific gravity are separately precipitated in such manner as to be removed during and without interruption to the operation of the process; second, chemical treatment and subsidence, whereby the mass is practically disinfected and deodorized, so that the effluent water may be discharged with safety to health and without occasioning a nuisance, and all organic substances precipitated and removed, as before explained with reference to other precipitated matter.

The works or means employed to perform these operations are herein considered, for the sake of clearness of description, as comprising two apparatuses, I and II, the first of which is adapted to accomplish the preliminary treatment and the second the chemical operation.

The water-carried sewage to be treated is first, by preference, collected in a reservoir, A, of suitable construction, from whence it is led to the reservoir of apparatus I by two pipes, $a\,a$. The reservoir of apparatus I is composed of two receiving-basins, B B, located one at each end of said apparatus, a precipitating-basin, C C, intermediate of said receiving-basins, and a discharge-basin, D, in the center of said precipitating-basin. The pipes $a\,a$ enter the receiving-basins B B near the bottoms thereof, and so as to discharge the water-carried sewage in substantially the center of such basins when viewed from above, as represented in Fig. 1. Directly over the discharge-orifices of the pipes $a\,a$ are arranged hoods $b\,b$ of conical form, constructed of sheet metal or other suitable material, and maintained in position in the basins B B to deflect or counteract the upward current quality that the effluent matter of the pipes $a\,a$ would otherwise have, and so cause said matter to tranquilly rise in said basin, as indicated by the arrows. This control of the sewage as it enters the basins B B gives opportunity for the precipitation of matter of heaviest specific gravity contained therein—such as gravel, &c.—which falls or gathers in the receptacles $c\,c$ at the bottom of the basins B B directly under the hoods $b\,b$. Each receptacle is provided a short distance below the entrance thereto with a gate, $d$, constructed to slide in ways formed in the sides of said receptacle, and provided with a rod, $e$, to serve as a handle extending through to the outside of the structure, thus affording means for the manipulation of said gate $d$ to open or close communication of basin B with the main portion of receptacle $c$, which latter is provided at its outlet with another gate similar in construction and operation to gate $d$, so that when receptacle $c$ shall have become substantially filled with precipitated matter, with gate $d$ withdrawn or open and the other gate closed, the former may be closed and the latter opened, and the contents of the receptacle removed without interrupting the working of the general apparatus.

The sewage rising in the basins B flows out over the tops thereof and is emptied into the basin C C, the bottom of which inclines downward to the center, where there is provided a receptacle, $g$, similar in construction to receptacles $c\,c$, and having gates $h\,i$ for a purpose like to that of gate $d$. The flow or gravity of the water in basin C C is such as to carry matter second in specific gravity to such as was deposited in the receptacles $c\,c$ to and precipitate it in the receptacle $g$, whence it is discharged in the manner already intimated. The light particles—such as fat and fibrine—contained in the mass which rise to the surface and cannot by natural law be precipitated are carried off by traveling belts 5 5, arranged at an incline with respect to a horizontal plane, so that one part shall be slightly immersed in the mass in basin C C and the other part extend out thereabove, as pictured in Fig. 2. Said belts 5 5 are stretched over rollers 6 6, which are operated by any convenient mechanical means. The sewage flowing into basins C C rises in central basin, D, through the opening $j$ in the bottom thereof directly over the receptacle $g$, and flows out over the top of said basin D into a receptacle, $k$, whence it is conveyed by troughs $l\,l$ to the tops of basins E E in apparatus II, into which latter basins it flows, apparatus II being arranged at a slightly lower horizontal plane than apparatus I.

Each basin E E is equipped with a rotary stirrer, $m$, provided with wings or blades $m'$, adapted to operate horizontally in the basins, so as to rather overcome any current created by the mass flowing therein than to aggravate such current, as shown in Figs. 1 and 3. In Fig. 5 I have shown a modified construction of stirring devices. In this latter instance two stirrers, $m^2\,m^2$, are shown rotated in opposite directions by means of a bevel-gear, $m^3$, on the upper end of the central shaft of each stirrer intermeshing with a bevel-gear, $m^4$, on a rotary shaft, $m^5$, extending across the top of the basins E. In the examples shown, in which a single stirrer is employed in each basin E, the central shaft of such stirrer is supplied upon its upper end with a bevel-gear, $m^6$, operated by any suitable mechanical means, and as the sewage flows into said last-mentioned basin chemicals calculated to cause subsidence or precipitation of all organic matter in the mass, and at the same time disinfect and deodorize the same, are gradually supplied to the stirrers and are thoroughly intermixed with the mass as it descends through the basins E. Such portions of the chemicals employed as have not been entirely dissolved in passing through the stirrers or are of greater specific gravity than the mass treated settle in the receptacles $n$, similar to receptacles $c$ and $g$, at the bottom of basins E, whence they are pumped up through pipes $o\,o$ into the tops of said basins, to be again used as before. This pumping of the undissolved chemicals back into the top of the basin to be reused is an important feature of my invention.

The undissolved chemicals being of much greater specific gravity than the sludge or semi-solid matter contained in the liquid, will fall directly into receptacles $n$, while the movement of the water will cause the other matter held in suspension to be carried over into reservoir F and there deposited. A separation sufficient for all practical purposes of the undissolved or combined chemicals from the solid matter is thus secured.

As a means for returning the chemicals from the bottom of the chambers $n$, I provide centrifugal pumps $x$, driven from any suitable source of power and arranged to take the material from the bottom and discharge at one side the stirrers, as shown in Fig. 3, though any other suitable means may be employed.

The treated mass descending through the basin E rises through the chambers p p, formed at the sides of said basins, as indicated by the arrows, and flows into the basin F, similar in construction to basin C C, and, like the latter basin, provided at the lowermost point of its inclined bottom with a receptacle, q, having controlling-gates r s, similar in construction and function to the gates in receptacles c and g.

Substantially all organic matter now contained in the mass is precipitated in the bottom of basins F F and allowed to remain therein until it fills the basin to a point slightly above the bottom of basin G, as shown at s' s', and this precipitated matter serves as a filter-bed to the water forced by pressure therethrough, and which rises disinfected, filtered, and purified sufficiently to meet ordinary sanitary requirement through the basin G, similar to basin D, and flows over the upper edge thereof into the trough t, by which it is finally discharged.

In instances where the highest degree of purity is required for the water discharged—as, for example, where the effluent water flows into a water-course from which drinking-water for a community or city is obtained—it may be desirable to again subject said effluent water to chemical treatment in another apparatus similar to apparatus II.

As the precipitated matter, s' s', accumulates in basin F F and it becomes difficult for the water to be filtered therethrough, a portion of of said matter, s' s', is removed by a manipulation of the gates r s, as already explained, it being designed to retain a substantially uniform amount of matter, s' s', in the basin F F and to have this amount such as experience may prove sufficient to best serve as a free filtering agent. The reason for so controlling the mass being treated as that it shall be deprived as far as possible of appreciable current is that the water shall not only not operate to hinder free and natural precipitation or subsidence of organic matter, as described, but that its gravity shall assist to effect this result, which it does in a way that will be understood by those skilled in the art without further explanation than such as has been given and an inspection of the drawings afford.

It will be noted that the system herein described is continuous and that the feature of supplying the inflow of sewage from more than one source and passing it through large reservoirs will effectually decrease in a large measure the current, certainly much greater than where there is but one inlet of the full capacity of the discharge, so that the material must pass in one straight line to the exit, and the matter having to pass down and rise up through the central chambers will be, in connection with the described supply, sufficient to allow the heavier matters to settle in the appropriate receptacles.

By this system of treating water-carried sewage all organic matter is removed therefrom and separated into four distinct and different products: first, a product comprising such matter as is of heaviest specific gravity removed from the receptacles c c, and which is of little or no use; second, a product comprising fat and fibrine, the matter of lightest specific gravity, or such as is removed from the surface of the mass in the basins C C, comprising fibrine and oily matter; third, a product comprising matter of second greatest specific gravity, precipitated and removed from receptacle g; and, fourth, the finer organisms, not before precipitated, which are deposited in and removed from the receptacle q.

The chemicals to be selected for use in apparatus II will depend upon, first, the component character of the sewage; second, the facility for procuring the chemicals, as also the cost of the same; third, the rules and requirements of the health-board or sanitary authorities under whose jurisdiction the process may be practiced, and, fourth, the influence of the chemicals on the products which it is desired to gain.

The chemicals and materials which will be found suited to most circumstances, purposes, and requirements are quicklime, plaster-of-paris, either in its crude or refined state, or mineral salts—such as anhydrit, boracit, chromate, kieserit, polyhalit, tachydrit, kainit, pikromerit, astrakanit—or acids, oils, and tars containing carbolic acid and creosote, or waste matter and other things used in the manufacture of soda-water, in bleaching, and similar chemical operations, or alkalines, carbonic acid, phosphate, and magnesium salts.

Since by my process quicklime, plaster-of-paris, and mineral salts or similar waste matter or their equivalents are used at the same time, a perfectly clear water is produced and about seventy-five per cent. of the nitrogen contained in the sewage is absorbed, a considerable part of ammonia having been carried away through the previous mechanical process. This is a degree of purity seldom reached by any simple system of filtering water.

The chemicals requiring pulverization to any extent can be treated in any suitable crushing-machine.

As before stated, the pumping of the undissolved chemicals back into the apparatus to be again used is an important part of my invention, and so, also, is the step in the process by which the chemicals are mixed with the mass under treatment. The pumps to be used may be such as are best suited to the purpose, and the stirrers for mixing the chemicals with the water-carried sewage should be of such character or structure as are best calculated to perform the work, such structure depending somewhat on the character of the mass.

The fat or oily matter and fibrine removed from the mass may be separated by the use of sulphuret of carbon or naphtha, and when thus treated the fat may be used in the manufacture of soap or for any other suitable purpose and the fibrine for the manufacture of paper.

The sludge removed from receptacle $g$ in apparatus I may be mixed by any suitable means with acids for the purpose of collecting the ammonia, after which it may be collected in a vacuum apparatus, heated by steam, and by steam forced into a filter press and the water and fat expelled. The residue will form a cake which, after pulverization, affords a very good fertilizer, capable of convenient use.

The precipitated matter removed from receptacle $q$ may be heated in a monte-jus and the derived ammonia collected in vessels containing sulphuric acids, which results in sulphate of ammonia, or the ammonia may go over into ammonium.

The remaining mass of receptacle $q$ may be heated and pressed through a filter, which process furnishes, after the product has been cleansed by bituminous disinfectants, a very useful plaster or mortar. If, however, the precipitated matter removed from receptacle $q$ can be readily utilized in the neighborhood as a fertilizer and it commands a good market price for this purpose, it may be thus used, and there will be no need of subjecting the sludge to a heating process in a monte-jus, it being only necessary in such case to add acids to the mass for collecting the ammonia and alkalines.

The expressed acidulated water in the treatment of the sludge should of course be returned to the main mass of sewer-water to be purified with the latter before being finally discharged.

The manner of treating the sludge after its separation from the water-carried sewage forms no part of my present invention, the several ways hereinbefore suggested of utilizing the products of my improved process being merely instanced to show the importance of separating the component parts of the sewage in order to make its treatment a matter of profit.

I would have it understood that my process is not limited to the treatment of water-carried sewage, but may be employed in the purification of water employed in the conduct of various industrial establishments, or in lieu of filter-beds, &c., for the removal of impurities in water supplied to cities or communities, only such modifications being necessary as are required to adapt it to the particular circumstances of the case.

The system described may be conducted, as has been shown, without interruption and without nuisance, and the water-carried sewage treated as fast as it forms and before any offensive or poisonous gases are generated by decomposition.

The apparatus employed is simple in construction and comparatively inexpensive to build, and, inasmuch as little attention is necessary to operate the system, it may be prosecuted so as to not only cover the expense incurred to secure perfectly the sanitary ends aimed at, but to derive a profit therefrom as well.

Another matter to be noted is the small amount of space occupied by the means employed in carrying out the system, which, in communities where areas of land of considerable extent suitable to the purpose are not readily obtained, is a matter of importance and a point of great advantage as compared with known systems which require large plains for reservoirs, basins, filters, &c., and extensive buildings as well.

Having thus described my invention, what I claim is—

1. In an apparatus for treating water-carried sewage, the combination, with a reservoir having a depression and a valved discharge-passage leading from said depressed portion, of a vertical basin having its lower end extending into the depressed portion of the reservoir, substantially as described.

2. In an apparatus for treating water-carried sewage, the combination, with a vertical receiving-basin having a discharge-opening at its bottom and a supply-opening above the same, a reservoir communicating with said basin near the upper portion thereof, having a depressed portion, and a valved discharge-passage leading from the bottom of said depressed portion, of a vertical basin in said reservoir, having its lower end extending into the depressed portion thereof, substantially as described.

3. In an apparatus for treating water-carried sewage, the combination, with the vertical receiving-basin having a discharge at the bottom, a supply-opening above the same, and a hood located over said supply-opening, of a reservoir communicating with said basin near the upper portion thereof, having a depressed portion, a valved discharge-passage leading from the bottom of the reservoir depression, and a discharge for the liquid, substantially as described.

4. In an apparatus for treating water-conveyed sewage, the combination, with a reservoir having a depression, a valved discharge leading from the bottom of said depressed portion, of a vertical basin having its lower end extending into the depressed portion and provided at its upper portion with an overflow-discharge, and a second reservoir communicating with said discharge, substantially as described.

5. In an apparatus for treating water-carried sewage, the combination, with a reservoir having a depression and a valved outlet extending from the bottom of said depression, of a basin located at one side said reservoir and a communication between the bottom of said basin and the reservoir above the depressed portion, and means for supplying and commingling deodorizing agents with the liquid in said basin, substantially as described.

6. In an apparatus for treating water-carried sewage, the combination, with a reservoir having a depression, a valved outlet extending from the bottom of said depression, of a basin located at one side the reservoir and connected to the latter above the depression, stirrers located within the basin, a supply-passage communicating with the basin at the upper portion thereof, and a discharge-passage leading from the bottom of said basin and adapted to communicate with said supply-passage, substantially as described.

7. In an apparatus for treating water-carried sewage, the combination of a reservoir having a depression, a valved outlet extending from the bottom of said depressed portion, a vertical basin having its lower end extending into said depressed portion, and an endless carrier suspended in said reservoir and communicating with the upper portion of the basin, substantially as set forth.

8. In an apparatus for treating water-carried sewage, the combination of a reservoir having a central depression, a valved outlet leading from the bottom of said depression, a vertical basin having its lower end extending into said depressed portion, and vertical basins at opposite sides, each communicating at its upper portion with the reservoir and provided with a supply and with a discharge-opening in its bottom, substantially as described.

9. In an apparatus for treating water-carried sewage, the combination, with a reservoir and a valved discharge-passage leading from the bottom thereof, of a vertical basin located within said reservoir and communicating therewith at the bottom and provided at its upper portion with an overflow-discharge, substantially as described.

10. In an apparatus for treating water-carried sewage, the combination of a reservoir having a depression, a valved outlet extending from the bottom of said depression, a vertical basin located in said reservoir and having its lower portion extending into the depression thereof, and a second vertical basin located at one side of said reservoir and provided with means for supplying and commingling deodorizing agents with the liquid, substantially as described.

In testimony whereof I have signed my name to this specification, in the presence of two subscribing witnesses, this 8th day of December, 1886.

CARL LOETZING.

Witnesses:
C. F. BROWN,
CHARLES A. ROGERS.